United States Patent [19]

Dannoura

[11] Patent Number: 4,741,379

[45] Date of Patent: May 3, 1988

[54] HORIZONTAL MOLD CLAMPING AND VERTICLE INJECTION TYPE INJECTION MOLDING MACHINE

[75] Inventor: Sadayuki Dannoura, Yamaguchi, Japan

[73] Assignee: Ube Industries, Ltd., Japan

[21] Appl. No.: 70,900

[22] Filed: Jul. 8, 1987

[51] Int. Cl.⁴ .............................................. B22D 17/12
[52] U.S. Cl. .................................................... 164/312
[58] Field of Search ................................. 164/312–314, 164/113, 120; 264/467–475, 479, 493, 494, 489

[56] References Cited

U.S. PATENT DOCUMENTS 4,655,274 4/1987 Dannoura ....................... 164/342 X

FOREIGN PATENT DOCUMENTS 58-103949 6/1983 Japan ................................... 164/312

Primary Examiner—Kuang Y. Lin
Attorney, Agent, or Firm—Remy J. VanOphem

[57] ABSTRACT

A horizontal mold clamping and vertical injection type injection molding machine includes stationary and movable metal molds clamped with each other with respect to a vertical mating plane and a vertical casting unit pivotally located below the stationary and movable metal molds. The vertical casting unit has a pivoting center at a position deviated from the vertical mating plane between the stationary and movable metal molds toward the stationary metal mold and is inclined during injection.

1 Claim, 2 Drawing Sheets

HORIZONTAL MOLD CLAMPING AND VERTICLE INJECTION TYPE INJECTION MOLDING MACHINE

BACKGROUND OF THE INVENTION

The present invention relates to a horizontal mold clamping and vertical injection type injection molding machine.

In prior art injection molding machines such as a die cast machine or a plastic injection molding machine, the mold clamping direction and the injection direction are generally the same. However, in recent years, a horizontal mold clamping and vertical injection type injection molding machine in which molten metal or resin is injected from below into a cavity defined by horizontally clamped metal molds has been developed.

An injection molding machine of this type, e.g., a die cast machine is advantageous in that the length of the molten metal in the casting sleeve is short so that the temperature decrease is small, that the contact area between the molten metal and air is small so that the number of voids formed in the product caused by gas contained in the injection cylinder is small, and that at the time of completing the filling, the injection pressure is efficiently transmitted since the injection plunger is correctly opposed to the mold cavity.

An example of a horizontal mold clamping and vertical injection type die cast machine is disclosed in U.S. Pat. No. 4,655,274 to the present applicant.

Although the die cast machine of this type has the above advantages, when a core device is provided, the following problem is posed.

That is, when the core device is provided below the metal molds, the core device and a casting unit interfere with each other because the casting unit is provided immediately below the metal molds.

In addition, the casting unit is pivoted from an injection state wherein the unit is vertically arranged to a molten metal supply state wherein the unit is inclined, and this pivoting angle is increased as the injection molding machine is made smaller in size. As a result, an installation space is undesirably increased, and it becomes difficult to pivot the casting unit through a large pivoting angle.

SUMMARY OF THE INVENTION

It is a principal object of the present invention to provide a horizontal mold clamping and vertical injection type injection molding machine which eliminates the above conventional drawbacks.

A horizontal mold clamping and vertical injection type injection molding machine according to the present invention comprises stationary and movable metal molds clamped with respect to vertical mating plane and an casting unit pivotally provided below the respective metal molds, wherein the casting unit has a pivoting center at a position deviated from a plane including the vertical mating plane between the stationary and movable metal molds toward the stationary metal mold and is fixed to be inclined during injection.

When the above arrangement is adopted, a core device can be provided below the metal molds since the casting unit is not placed immediately below the metal molds.

In addition, since the pivoting center of the casting unit is located below a stationary platen, a pivoting angle at the time of supplying a molten metal can be significantly decreased, thereby decreasing an installation space.

DETAILED DESCRIPTION OF THE PREFERRED EMBODIMENT

The present invention will now be described in detail with reference to an embodiment shown in the accompanying drawings.

Figure 1:
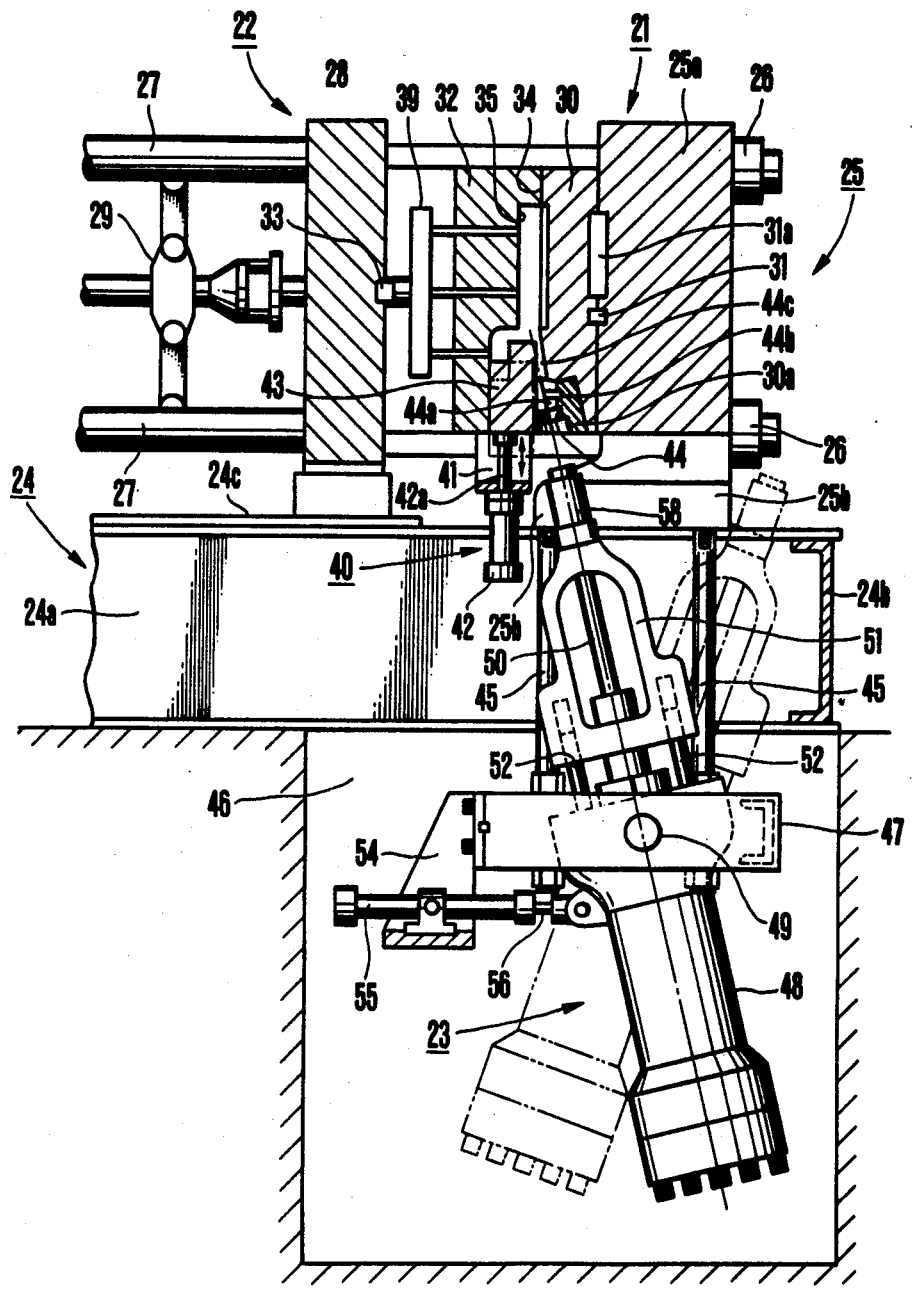
FIG. 1 is a longitudinal sectional view showing an arrangement of the present invention.
Figure 2:
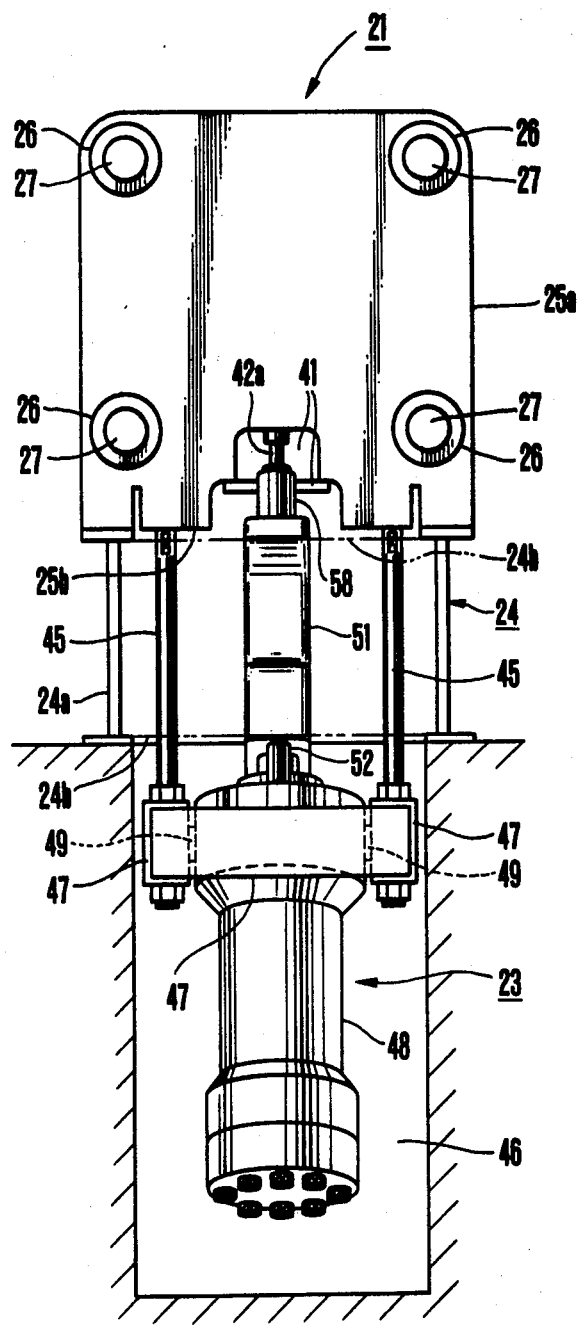
FIG. 2 is a side view of the present invention shown in FIG. 1.

In FIGS. 1 and 2, a die cast machine 21 includes a horizontal mold clamping unit 22 and a vertical casting unit 23, and the entire horizontal mold clamping unit 22 is fixed on a machine base 24 fixed on a floor. The machine base 24 is integrally formed by a pair of right and left supporting members 24a extending along the longitudinal direction thereof and coupling members 24b (one of them is not shown) for coupling both the ends of the supporting members 24a. A pair of right and left sliding plates 24c as long sliding members each formed to have a cross section of a flat rectangular shape are integrally formed to be parallel to each other respectively on the upper end portions of the right and left supporting members 24a. A stationary platen 25 of the horizontal mold clamping unit 22 is integrally formed by a substantially square vertical member 25a having sufficient stiffness and a horizontal member 25b horizontally extending from the lower end portion of the vertical member 25a except portions on the right and left sliding plates 24c. The lower end portion of the vertical member 25a is fixed on the machine base 24 by a plurality of bolts.

A cylinder platen (not shown) is movably provided at the other end of the machine base 24 to oppose the stationary platen 25, and the stationary platen 25 and the cylinder platen are coupled with each other at their four corners by columns 27 fixed by nuts 26. Reference numeral 28 denotes a movable platen fitted on the columns 27 to oppose the stationary platen 25. The movable platen 28 is formed to be moved on the sliding plates 24c away from or close to the stationary platen 25 and is coupled to the cylinder platen by a toggle mechanism 29. Reference numeral 30 denotes a stationary metal mold, vertical movement of which is regulated by a horizontal key 31 provided to the stationary platen 25, and which is positioned in the vertical direction of the paper by a vertical key 31a provided at the center of the stationary platen 25. Reference numeral 32 denotes a movable metal mold mounted in the movable platen 28 so that vertical movement thereof is regulated by a key 33. Both the metal molds 30 and 32 are mated with each other with respect to a mating plane 34 to be freely opened/closed in the horizontal direction. Note that the vertical key 31a is provided on the central line of the machine and between the stationary platen 25 and the stationary metal mold 30 so that a core of the stationary metal mold 30 in the horizontal direction can be easily mated with, e.g., a casting sleeve 58 (to be described later) of the vertical casting unit 23 provided on the central line of the machine and below the mating plane 34 between the stationary and movable metal molds 30 and 32. Reference numeral 39 denotes a push out device for pushing out cast products from a cavity 35.

On the other hand, a core device 40 is provided below the movable metal mold 32.

The core device 40 has a supporting frame 41 fixed at the lower side of the movable metal mold 32 and a cylinder 42 vertically fixed to the supporting frame 41, and a core 43 is fixed to a piston rod 42a of the cylinder 42.

The core 43 is provided below the mating plane 34 between the stationary and movable metal molds 30 and 32 to be vertically movable.

Half holes 44, in which the casting sleeve 58 of the casting unit 23 to be described later is fitted, are formed at the lower end portion of the core 43 at the side of the stationary metal mold 30 and at a half sleeve 30a fixed to the lower end portion of the stationary metal mold 30 at the side of the core 43, respectively, so that an axis of each hole 44 is inclined by a predetermined angle.

That is, the holes 44 are formed at the mating plane between the metal molds to be divided in two at the sides of the core 43 and the stationary metal mold 30, respectively. When the respective holes 44 coincide with each other, a complete circle is obtained.

A semi-ring-like groove 44b is horizontally provided on an upper portion of the stationary metal mold 30 side inner surface of a smaller-diameter hole 44a which is located above the holes 44 and through which the molten metal passes. The groove 44b is provided to capture a shell as a solidified material of the molten metal produced on the inner surface of the hole 44a or the casting sleeve 58 so that the shell does not enter into the cavity 35. Reference numeral 44c denotes a constricted portion.

The casting unit 23 is mounted through four tie rods 45, upper ends of which are threadably engaged with screw holes open in the horizontal member 25b of the stationary platen 25.

That is, the lower end of each tie rod 45 extends downward into a pit 46 provided in the floor surface, and a frame 47 is fixed to the lower end.

An intermediate portion of a clevis injection cylinder 48 is pivotally supported by the frame 47 through a shaft 49, and a plunger 50 is coupled to a piston rod thereof.

The shaft 49 which is a pivoting center of the injection cylinder 48 is deviated from a plane including the vertical mating plane 34 between the stationary and movable metal molds 30 and 32 toward the stationary platen 25. As a result, when the casting unit 23 such as the injection cylinder 48 is inclined at the time of injection, the axis of the casting unit 23 including the injection cylinder 48 coincides with the inclined axis of the holes 44 provided at the core 43 and the half stationary sleeve 30a.

On the other hand, a sleeve frame 51 is provided to surround the plunger 50.

An upper end of a ram rod 52 extending from the injection cylinder 48 is slidably fitted in a cylinder provided at the lower end of the sleeve frame 51. A hydraulic pressure can be guided into the cylinder in the sleeve frame 51 in which the ram rod 52 is fitted, so that the sleeve frame 51 can be vertically moved independently of the injection cylinder 48.

The casting sleeve 58 to be fitted in the holes 44 is fixed at the upper end portion of the sleeve frame 51, and a plunger tip (not shown) fixed at the upper end of the plunger 50 is slidably fitted in the casting sleeve 58.

An intermediate portion of a tilting cylinder 55 is pivotally supported on the side surface of the frame 47 through a bracket 54.

A piston rod 56 of the cylinder 55 is pivotally coupled to the injection cylinder 48.

Therefore, when the tilting cylinder 55 is operated, the injection cylinder 48 can be freely pivoted about the shaft 49.

An operation of the embodiment having the above arrangement will be described below.

When the metal molds are separated, the casting unit 23 is pivoted clockwise as indicated by an alternate long and two dashes line in FIG. 1, i.e., is in a molten metal supply position, and the molten metal is supplied into the casting sleeve 58 by a molten metal supply device (not shown).

Then, mold clamping is performed such that the movable metal mold 32 is mated with the stationary metal mold 30, the cylinder 40 for the core 43 is operated, and the core 43 is fitted in the lower end portion of the cavity 35, as shown in FIG. 1.

In this state, the tilting cylinder 55 is operated so that the casting unit 23 is pivoted counterclockwise as indicated by the solid line in FIG. 1.

At this time, the axis of the plunger 50 coincides with that of the holes 44.

In this state, the sleeve frame 51 and the plunger tip are moved upward while maintaining substantially the same relative positional relationship, and the casting sleeve 58 is fitted in the holes 44.

Then, the injection cylinder 48 is operated to move the plunger 50 forward, and the plunger tip is moved upward in the casting sleeve 58, thereby supplying the molten metal into the cavity 35.

When a predetermined time has passed after the molten metal is supplied, the casting sleeve 58 is moved backward to be separated away from the holes 44.

Subsequently, the cylinder 40 is operated to pull out the core 43, the metal molds are separated, and a cast product is removed therefrom.

As has been described above, the embodiment adopts an arrangement in which the pivoting center of the casting unit is deviated toward the stationary platen. Therefore, even when the core device is located below the metal molds, it can be operated so as not to interfere with the casting unit.

In addition, since the pivoting angle of the casting unit can be decreased, the present invention can be applied to a small injection molding machine.

As is apparent from the above description, since the present invention adopts the arrangement in which the pivoting center of the casting unit is deviated toward the stationary platen, a relatively large space can be obtained below the metal molds, and the core device can be located below the metal molds so as not to interfere with the casting unit. As a result, the core device can be arbitrarily located without any limitation, and the number of types of products which can be cast are largely increased, thereby improving practicality of the machine.

In addition, since the pivoting angle of the casting unit with respect to the vertical line can be decreased when the casting unit is inclined to be in a molten metal supply position, the present invention can be applied to a small injection molding machine with many limitations in terms of a space.

Note that in the above embodiment, the half stationary sleeve 30a is provided to the stationary metal mold 30. However, as another embodiment, an additional half stationary sleeve may also be provided on a surface of the core opposing the half stationary sleeve 30a.

What is claimed is:

1. A horizontal mold clamping and vertical injection type injection molding machine comprising:

stationary and movable metal molds clamped with each other with respect to a vertical mating plane; and a vertical casting unit pivotally located below said stationary and movable metal molds, said vertical casting unit having a pivoting center at a position deviated from the vertical mating plane between said stationary and movable metal molds toward said stationary metal mold and being inclined during injection.

* * * * *

UNITED STATES PATENT AND TRADEMARK OFFICE
CERTIFICATE OF CORRECTION

PATENT NO. : 4,741,379

DATED : May 3, 1988

INVENTOR(S) : Sadayuki Dannoura

It is certified that error appears in the above-identified patent and that said Letters Patent is hereby corrected as shown below:

Kindly correct the title on the first page of the patent to read:

Page 1, in the title, delete "VERTICLE" and insert ---- VERTICAL ----.

Column 1, line 2, delete "VERTICLE" and insert ---- VERTICAL ----.

Signed and Sealed this

Twenty-second Day of November, 1988

*Attest:*

DONALD J. QUIGG

*Attesting Officer*

*Commissioner of Patents and Trademarks*